United States Patent [19]

Bowser et al.

[11] 3,730,140
[45] May 1, 1973

[54] SLAT FLOOR ASSEMBLY

[75] Inventors: John O. Bowser, Natrona Heights; Nicholas I. Moga, Pittsburgh, both of Pa.

[73] Assignee: Aluminum Company of America, Pittsburgh, Pa.

[22] Filed: Sept. 1, 1971

[21] Appl. No.: 177,135

[52] U.S. Cl. ................................................. 119/28
[51] Int. Cl. ............................................. A01k 1/00
[58] Field of Search .................... 119/28, 16; 52/579, 52/664, 665, 584

[56] References Cited

UNITED STATES PATENTS 3,528,391 9/1970 Johnson ................................. 119/28
3,191,723 6/1965 Shoup ................................. 52/665 X Primary Examiner—Hugh R. Chamblee
Attorney—David W. Brownlee

[57] ABSTRACT

A floor assembly is provided which is formed from a plurality of downwardly-open channel members arranged in parallel spaced relation and interconnected by means of pairs of adjacent connecting straps which are moved into position from opposite directions transverse to the longitudinal axes of the channels whereby attachment ears on the straps engage over edge flanges on the channel members. The connecting straps may have aligned keyways in them for receiving locking keys which lock the straps and the channel members together to form a rigid floor assembly.

6 Claims, 8 Drawing Figures

Patented May 1, 1973

Patented May 1, 1973   3,730,140

SLAT FLOOR ASSEMBLY

BACKGROUND OF THE INVENTION

It is known to provide a floor construction for an animal enclosure or the like which comprises a plurality of channel members in parallel spaced relation and fastened together by associated connector clips engaging the channel members as disclosed in U.S. Pat. No. 3,528,391. Such floor constructions are intended for positioning over an open pit in which animal waste may be accumulated. The ends of the floor construction may rest on associated vertical walls or ledges for supporting the construction over the pit. These floor constructions have become quite popular because of their convenience in construction and the ease by which they may be cleaned of animal waste. These constructions have not been without problems, however, in that the resiliency of the channel members which facilitates assembly of some floor constructions can result in accidental disengagement of a channel or channels. When a channel or channels become disengaged from the connector clips, an animal can catch a leg between the channels and may even fall through the floor between channels. Accordingly, a floor assembly is desired in which the individual channel members can be easily assembled, but which are rigidly interconnected so that they cannot become accidentally disassembled.

SUMMARY OF THE INVENTION

A floor assembly is provided which comprises a plurality of downwardly-open C-shaped channel members in parallel spaced relation and interconnected by means of pairs of adjacent connecting straps transverse to the longitudinal axes of the channels, with each connecting strap of each pair having an attachment ear engaged over one edge flange on each channel on the same side of each channel, and with the ears on adjacent straps engaging opposite edge flanges. The connecting straps may further have aligned keyways therein for receiving locking keys for locking the straps and channel members together to form a rigid floor assembly.

An object of the invention is to provide a floor assembly which can be easily assembled and which cannot become accidentally disassembled.

A further object of the invention is to provide a floor assembly comprising a plurality of downwardly-open C-shaped channel members which are interconnected by means of adjacent connecting straps and locking keys.

Another object is to provide a floor assembly which can be assembled and disassembled without the need for special tools.

Another object of the invention is to provide a floor assembly which has a uniform space between adjacent slats.

BRIEF DESCRIPTION OF THE DRAWINGS

The above and other objects and advantages of the invention will be more fully understood and appreciated with reference to the following description and the drawings appended thereto in which.

DESCRIPTION OF A PREFERRED EMBODIMENT OF THE INVENTION

Figure 1:
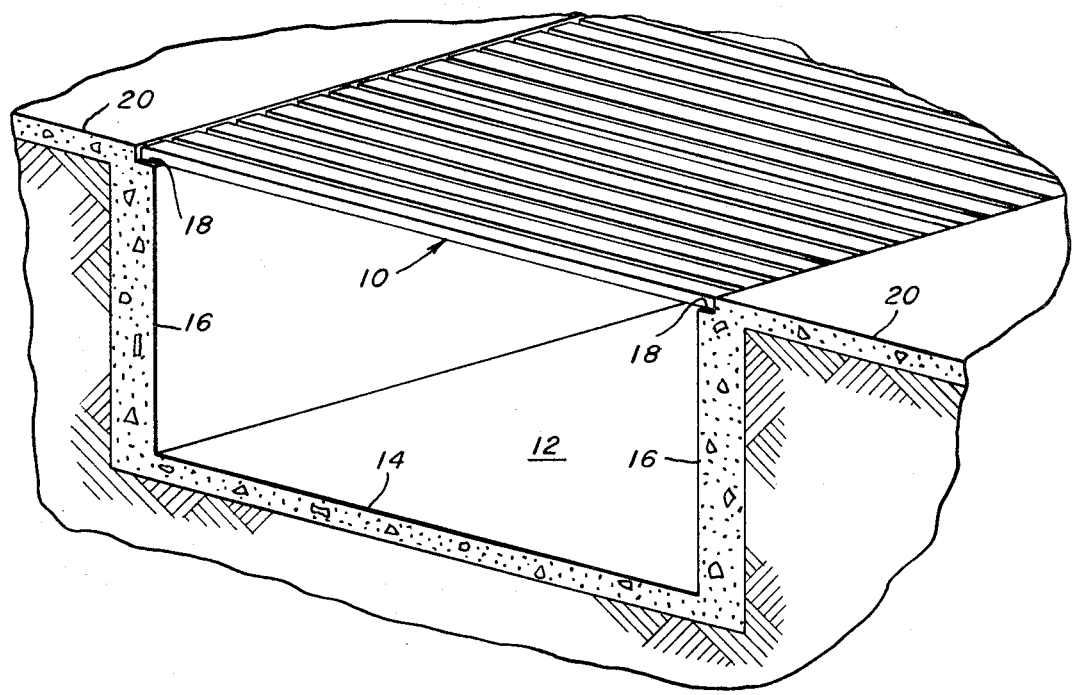
FIG. 1 is a perspective view of a floor assembly of the invention in position over a pit for receiving animal wastes.

Referring to FIG. 1, a floor assembly 10 is illustrated in position over an open pit 12 for animal waste material which falls through spaces between parallel channels or slats in the floor assembly. Pit 12 is illustrated as comprising a concrete bottom wall 14 and concrete vertical walls 16 with longitudinally extending steps or ways 18 in their tops for receiving the ends of a floor assembly 10. Concrete floor sections 20 may also be provided adjacent floor assembly 10 if desired. A livestock enclosure of conventional construction may be provided around and/or over floor assembly 10 and adjacent floor sections 20. It will be appreciated by those skilled in the art that floor assembly 10 and pit 12 with an enclosure thereover may be of any shape and dimensions that may be desired.

Figure 2:
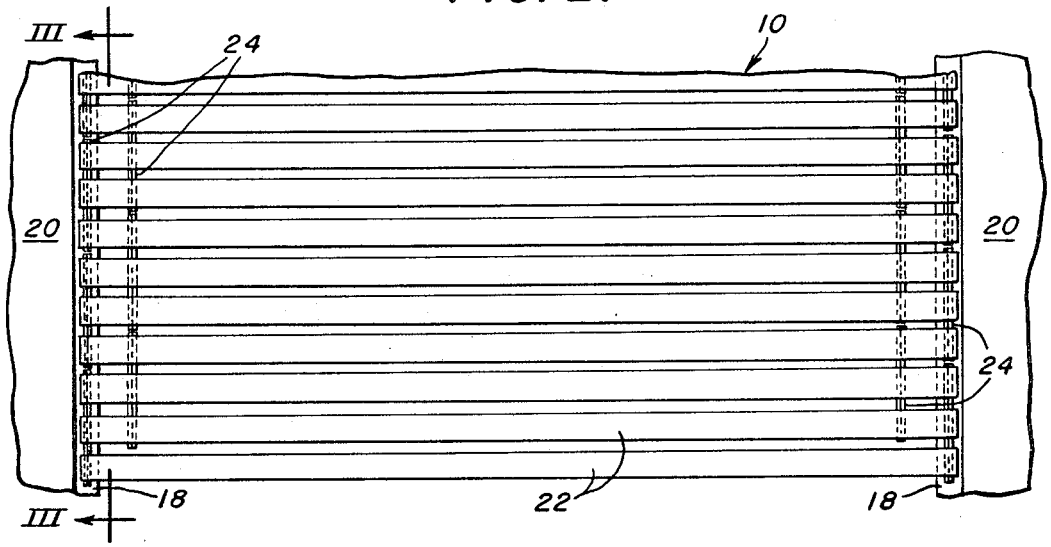
FIG. 2 is a plan view of the floor assembly of FIG. 1.
Figure 3:
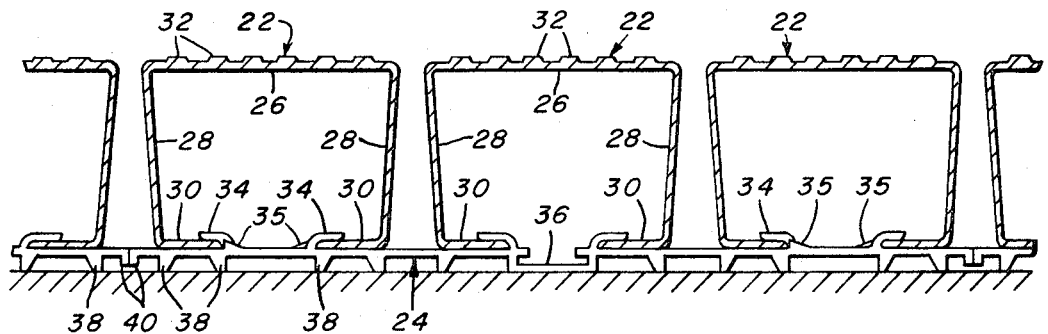
FIG. 3 is a fragmentary cross-sectional view taken along line III—III of FIG. 2.

Floor assembly 10 comprises a plurality of downwardly-open C-shaped channel members 22 in parallel spaced relation and interconnected by means of pairs of adjacent connecting straps 24 as shown in FIGS. 2 and 3. Channel members 22 and straps 24 are preferably formed from a hard temper aluminum base alloy, but may also be made of other materials. Aluminum base alloys are well suited to such use because they resist corrosion and can be extruded into the shapes without difficulty. Each channel members 22 comprises a load-carrying web 26 which preferably has a non-slip upper surface, downwardly and inwardly directed legs 28 and inwardly projecting edge flanges 30. The non-slip surface on web 26 may be of a variety of known forms, but preferably comprises a plurality of longitudinally extending ribs 32 which can be easily formed during extrusion of the channel members 22. Legs 28 on channels 22 are preferably inclined inwardly toward the center of the channels from top to bottom so that animal wastes will not collect between the legs of adjacent channels.

Connecting straps 24 are arranged in pairs which are aligned transverse to channels 22 and include upwardly disposed ears 34 which project toward one end of a strap for overlying engagement with edge flanges 30 on the channels, with the ears on adjacent straps projecting in opposite directions. All of straps 24 may be identical in shape, with adjacent straps in each pair oppositely oriented so that they can be moved into engagement with channels from opposite directions. When adjacent straps 24 are tied together as will be described, the opposite alignment of the straps locks them in engagement with flanges 30 on channels 22. Straps 24 may also have upwardly projecting lugs 35 which are spaced from ears 24 for engaging the opposite edge flange of a channel 22 to prevent twisting of the straps with respect to the channels.

Straps 24 which have been selected for illustration further have upwardly open keyways 36 therein for receiving keys which lock adjacent straps together. It will be appreciated that the shape of keyways 36 is not critical to the invention, and that many other shapes could also be used. Connecting straps 24 may further have downwardly projecting legs 38 for supporting the straps on a ledge or other floor support, and downwardly directed end flanges 40 for abutment against the end flanges on axially aligned straps.

As illustrated in FIGS. 2 and 3, a floor assembly comprises a plurality of parallel uniformly-spaced channel members 22 which are preferably interconnected by rows of aligned pairs of adjacent straps 24. In the floor assembly selected for illustration, there are four such rows of straps with each row including aligned pairs of adjacent straps locked together by means of locking keys as will be described. Each pair of connecting straps spans three channel members with the pairs in the two rows on each end of the floor assembly being overlapped with respect to the channel members so that all the channel members are interlocked into one assembly.

Although it will be appreciated that the individual connecting straps may interconnect more than three channels, they are preferably of limited length for purposes of convenient extrusion of the straps. A shape may be extruded which has a cross section corresponding to the side profile of a strap and this shape transversely cut into straps, the maximum length of which can be no more than the width of the extrusion. Since it is not practical to employ very wide extrusion dies, the width of the extruded shape, and therefore the length of the straps cut therefrom is limited accordingly. Longer straps could obviously be formed by larger extrusion apparatus or by fabricating the straps by other methods. One advantage of relatively short straps is that they are more easily assembled on channels to form a floor assembly than would relatively long straps which could interconnect more than three channel members. Connecting straps may be cut to any width as may be desired for strength and rigidity of a floor assembly.

A floor assembly of the invention can include any number of channel members 22, either odd or even in number, and may be interconnected by means of pairs of connecting straps 24 of various arrangements such as rows, staggered, etc. In the preferred embodiment which is illustrated in FIG. 2, a floor assembly is interconnected by a number of rows of pairs of straps 24 with a first channel member 22 connected to only one-half of the rows of straps and the straps in alternating rows preferably overlapped so that all of the channel members are interconnected. It will be appreciated that the arrangement of straps for a particular assembly will depend on a number of factors such as the type and location of support means, span length, number of channel members, and weight to be carried by the floor assembly among other factors. The floor assembly of FIG. 2 has the rows of straps on opposite edges supported on the vertical walls 18 of the pit and two inner rows of straps adjacent the vertical walls. With respect to the rows of straps 24 on wall supports 18, supporting legs 38 and keyways 36 on these straps are in contact with, and are supported on, the wall. The inner rows of straps 24 do not bear on the walls of the pit in FIG. 2, but this is not critical to the invention. In floor assemblies which comprise relatively long channel members, it may be desirable to provide an intermediate support between the ends of the channels in the form of an additional vertical wall or support members not shown. When such an intermediate support is provided, an additional row or rows of connecting straps may also be added for interlocking the center of the channels and for supporting the channels on the intermediate support.

Figure 4:
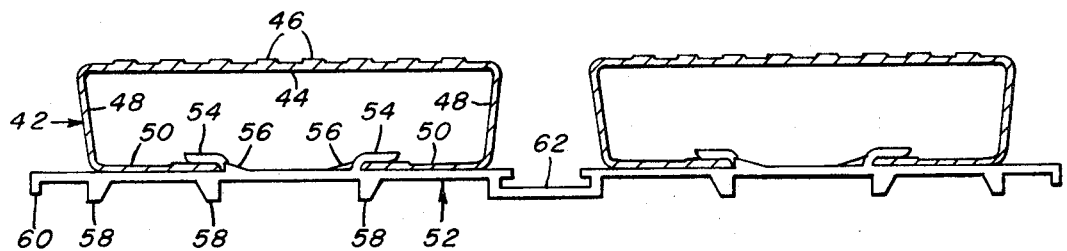
FIG. 4 is a cross-sectional view similar to FIG. 3 illustrating an alternative form of channel members.

An alternative embodiment of channels is illustrated in FIG. 4. Channels 42 of this figure have the same general structure as channels 22 illustrated in FIGS. 2 and 3, but are wider and shorter in profile and may have a shorter length than do channels 22. The greater profile height of channels 22 give them more strength against bending than have channels 42. Channels 22 of FIGS. 2 and 3 are designed for spans of approximately eight feet as compared to a span of four feet for channels 42 of FIG. 4. The permissible span depends on the shape and material of the channels, the load to be carried, and the support for the floor, among other factors, and can obviously be varied depending on such factors. Channels 42 comprise a load carrying web 44 with longitudinally extending ribs 46 thereon, supporting legs 48 and edge flanges 50 for engagement with ears 54 and lugs 56 on connecting straps 52.

Channels 42 are interconnected by means of connecting straps 52 in the manner described above with respect to channels 22 except that the straps span only two channels, and keyways 62 in straps 52 are located between channels rather than under the middle of the channels as illustrated in FIG. 3. Straps 52 further have legs 58 for supporting the straps and a floor assembly on a supporting wall or the like, and end flanges 60 for abutment between aligned straps. Connecting straps 52 may be assembled in a variety of arrangements with respect to channels 42 to interconnect all the channels, whether the straps be in rows or staggered. A key 64 such as that illustrated in FIG. 6 may be employed to lock adjacent straps together as is hereinafter described with respect to the first described embodiment of the invention.

Figure 5:
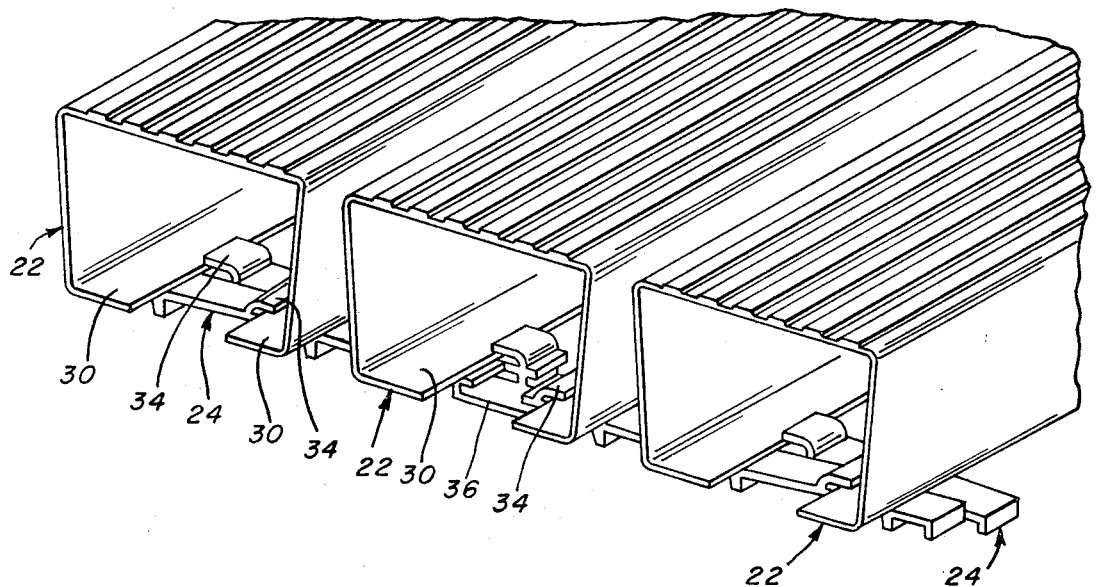
FIG. 5 is a perspective view illustrating assembly of a floor of the invention.

FIG. 5 illustrates connecting straps 24 being moved into position with ears 34 engaged over edge flanges 30 on channels 22. Edge flanges 30 slide over the tops of the lugs on connecting straps 24 as the straps are moved into position. When straps 24 are moved axially as far as they will go, edge flanges 30 which are opposite to ears 30 on the connecting straps will drop into position with lugs 35 engaged against the inner edges of the flanges (FIG. 3). This engagement of ears 34 and lugs 35 on opposite sides of a channel 22 restrains straps 24 from twisting with respect to the channels, and thereby helps to prevent accidental disengagement of the straps from the channels.

Figure 7:
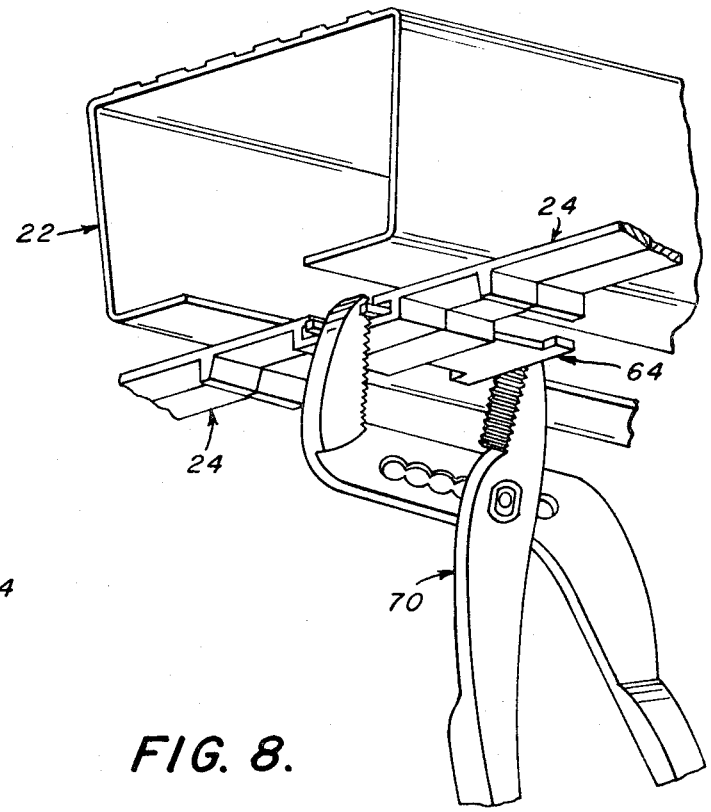
FIG. 7 is a perspective view of a locking key being inserted into aligned keyways in adjacent connecting straps.
Figure 6:
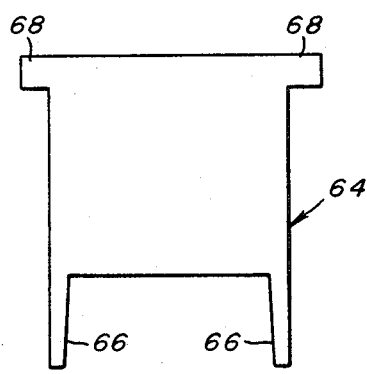
FIG. 6 is a plan view of a locking key for locking a floor assembly together.
Figure 8:
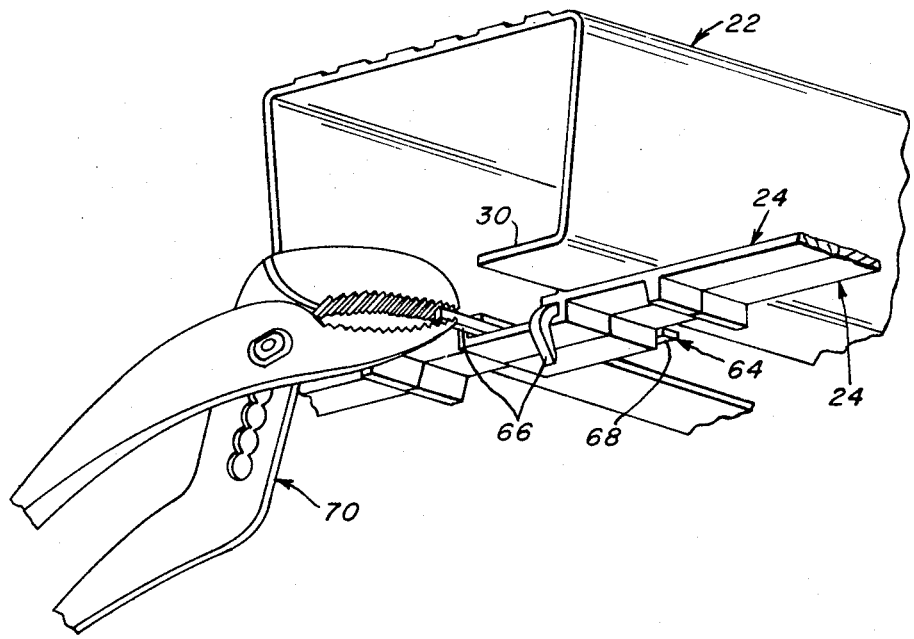
FIG. 8 is a perspective view showing crimping of the tabs on the locking key after the key has been positioned in aligned keyways in adjacent connecting straps.

Keyways 36 in adjacent straps 24 are aligned when the straps are moved as far as they will go against edge flanges 30 on channels 22. A locking key 64 (FIG. 6)

may then be positioned in aligned keyways 36 as illustrated in FIG. 7. Key 64 for keyways 36 may be flat and has a body portion with two projecting tabs 66 and two projecting ears 68. Key 64 can be pressed into aligned keyways 36 by means of a pair of pliers 70 or the like, and tabs 66 may be bent with the pliers to secure the key in the keyways. Locking keys are secured in position in this manner in all of the aligned keyways to secure all straps 24 and channels 22 together to form a rigid floor assembly. As secured, it is virtually impossible for the channel members in the floor to become accidentally disengaged. Channel members 22 of the invention are substantially rigid, and when the channels are locked together with connecting straps 24 and locking keys 64, edge flanges 30 on the channels cannot escape from engagement by the ears 34 on the straps. Accidental disassembly of the floor assembly is thereby prevented.

In the event that it ever becomes desirable to replace a channel or connecting strap, the locking keys can be removed from the connecting straps so that the ears on the straps can be disengaged from the channels for one or more channels to be removed from a floor assembly and replaced by another channel(s). The only tool that is required for such an operation is a pair of pliers or the like, and one man can do the job easily.

It is therefore seen that a floor assembly is provided which can be quickly assembled from a plurality of channel members, connecting straps and locking keys. The floor assembly is rigid and resists accidental dislodgement of individual channel members from the floor. It also resists corrosion and can be easily cleaned. Although a preferred embodiment of such a floor assembly has been illustrated and described, it will be apparent to one skilled in the art that many changes can be made in the assembly without departing from the invention.

What is claimed is:

1. A floor comprising a plurality of downwardly-open channel members in parallel spaced relation, each channel member having a load-carrying web, substantially vertical legs and inwardly projecting edge flanges, the channels being interconnected by means of pairs of adjacent connecting straps which are moved into position from opposite directions transverse to the longitudinal axes of the channels, each connecting strap of each pair having an attachment ear engaged over one edge flange on each channel on the same side of each channel, with the ears on adjacent straps engaging opposite edge flanges, and with adjacent straps further having aligned transverse keyways therein with locking keys secured in the aligned keyways to lock the straps and channel members together in the form of a rigid floor assembly.

2. A floor as set forth in claim 1 in which each of said keyways is an upwardly open channel with flanges along opposite sides thereof, and each of said locking keys has tabs thereon which are crimped to secure each such key in a keyway.

3. A floor as set forth in claim 1 in which said load-carrying web on each channel has a non-slip upper surface comprising a plurality of longitudinally extending ribs on the surface.

4. A floor assembly as set forth in claim 1 in which legs on said channels are inclined inwardly from top to bottom.

5. A floor assembly as set forth in claim 1 in which each pair of connecting straps interconnects less than all of the channel members in the floor assembly and the pairs of straps are overlapped with respect to the channels to interconnect all of the channels in the floor assembly.

6. A floor assembly as set forth in claim 1 in which the connecting straps have upwardly projecting lugs thereon which engage the channel edge flanges opposite the attachment ears to prevent horizontal rotation of the connecting straps.

* * * * *